United States Patent Office 3,561,137
Patented Feb. 9, 1971

3,561,137
TRAINING APPARATUS WITH HYDROSTATIC MOTION SYSTEM
Andre J. Guyon and David O. Gorgol, Binghamton, N.Y., assignors to Singer-General Precision, Inc., Binghamton, N.Y., a corporation of Delaware
Filed Nov. 1, 1968, Ser. No. 772,734
Int. Cl. G09b 9/06
U.S. Cl. 35—11                 3 Claims

ABSTRACT OF THE DISCLOSURE

Training apparatus in the form of a vehicle simulator, or the like, with a unique system for providing motion which realistically simulates that of an actual vehicle to the student station. An enclosure for the student or crew training compartment is floated in a container of water or other suitable liquid. The enclosure may be moved as desired upon the surface of the liquid by means of cables, or the like, and vertical motion may be imparted by raising or lowering the liquid level within the container.

---

The present invention relates to motion simulators for use in training students in the operation of land, air, or water vehicles. More specifically, the invention relates to means for imparting motion in any of several degrees of freedom to a student station within an enclosure which is floated on the surface of a liquid within a tank.

The training value of vehicle simulators has long been recognized. Great advantages in economy and safety may be achieved by training students in vehicle simulators, for certain phases of training, rather than in the actual vehicle. One of the important attributes of such simulators is the ability to impart acceleration cues to the student station to provide a realistic "feel" of the motion of the actual vehicle. Since the amount of motion in any given direction must be quite limited if the economic advantages of the simulator are to be maintained the need for accuracy in simulating the direction and magnitude of initial accelerations becomes even more acute. Attempts to impart a high degree of realism have resulted in simulator motion systems which are quite expensive and complicated and require very large power supplies.

The present invention employs a student station or training compartment which is contained within a watertight shell floated in a tank or other container of water. Cables are attached to the shell and are connected to suitable actuators anchored to a stationary support for reeling in or paying out the cables. The shell is thereby moved upon the surface of the liquid in an essentially frictionless manner by selective manipulation of the cables with relatively small power supplies. The shell may be translated along a vertical axis by selectively raising or lowering the level of liquid within the container while simultaneously reeling in or paying out all cables.

A principle object of the invention is to provide a system for imparting motion to vehicle training apparatus which provides a high degree of accuracy and realism with simplicity and economy.

A further object is to provide a motion simulator for vehicle training apparatus which can move large loads with relatively small power supplies.

Still another object is to provide novel means for imparting motion to a vehicle simulator wherein the student station is supported and moved on the surface of a liquid.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Vehicle training apparatus with motion simulation capability is commercially available for a wide variety of vehicles, principally those which are airborne. Flight simulators with motion capability normally comprise a simulated cockpit which is supported on mechanical framework for movement relative to a fixed base by means of hydraulic or other mechanical actuators. The simulator of the present invention, as previously mentioned, is supported and moved upon the surface of a body of liquid. While the scope of the invention is not to be limited by the type of vehicle simulated, it is particularly useful in simulating waterborne vehicles since the feel imparted by the bouyant force of the water to the actual vehicle may be directly reproduced in the simulator. It will also be apparent, and will be pointed out later in more detail, that the invention may be suitably employed to provide motion in any of the three translational and three rotational degrees of freedom. However, the gist of the invention may be easily understood from an exemplary embodiment providing motion in only three degrees of freedom and such an embodiment will be suitable to provide the necessary degree of motion simulation for most applications. Therefore, the embodiment of the invention shown in the accompanying drawings is adapted to provide motion in two rotational (pitch and roll) and one translational (vertical) degrees of freedom.

Figure 1:
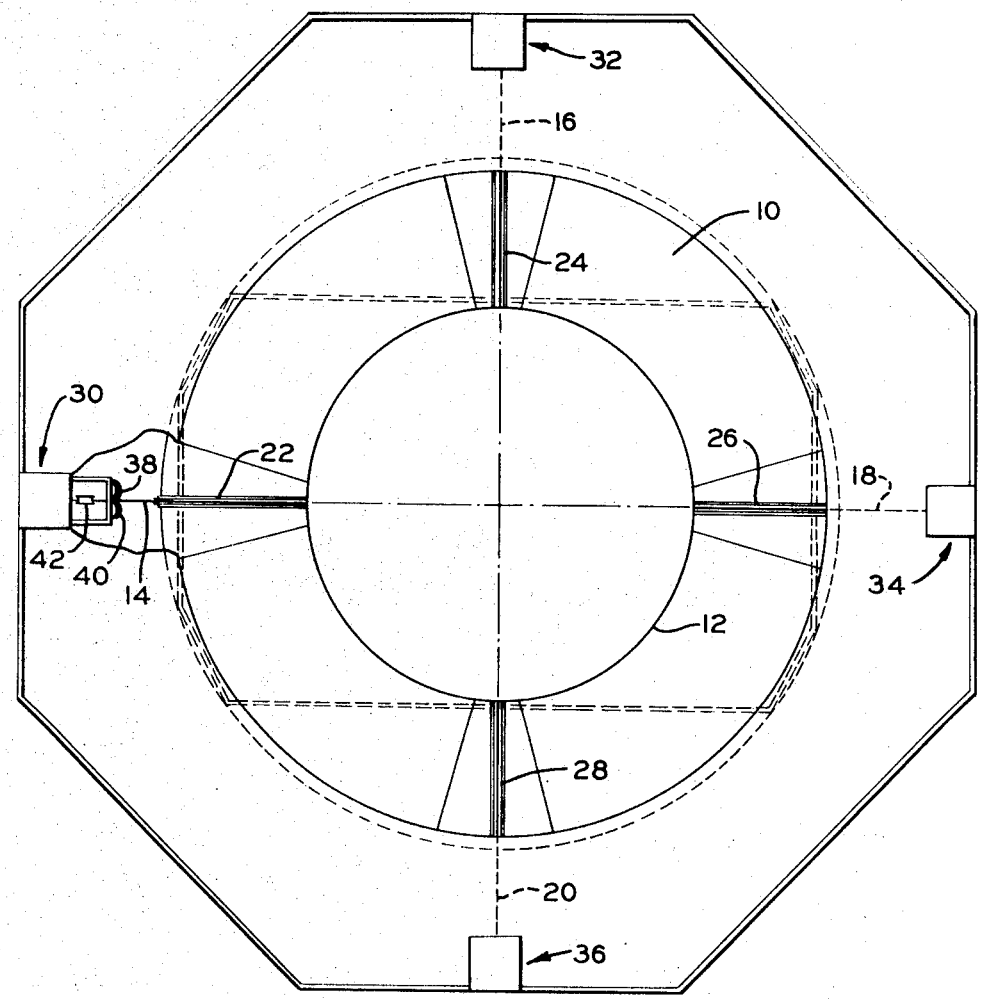
FIG. 1 is a top plan view of one embodiment of the vehicle simulator of the invention.

Referring now to the drawings, in FIG. 1 is shown a spherical shell 10, constructed of any structurally suitable, water tight material, which encloses the student or crew training compartment. In the illustrated embodiment, shell 10 has an opening, denoted by the reference numeral 12, in the top but the shell may be completely enclosed if desired with suitable access hatches at convenient locations. Also, enclosures having shapes other than spherical may be employed, as will become apparent, but a spherical shape is considered optimum for the disclosed embodiment.

Cables 14, 16, 18 and 20 are each attached at one end to shell 10 near the periphery of opening 12 at 90 degree intervals. Suitable V-shaped guides 22, 24, 26 and 28 are provided for the respective cables in fixed attachment to the outer surface of shell 10. Motion actuators indicated generally by the reference numerals 30, 32, 34 and 36 are anchored in stationary positions around the periphery of shell 10 adjacent each of the cable attachments.

Since each of the four cable arrangements and actuators may be identical in construction and operation only one will be shown and described in detail. Cable 14 passes from its attachment to shell 10 along cable guide 22, between a pair of guide pulleys 38 and 40 and around change-of-direction pulley 42. Pulleys 44 and 46 (FIGS. 2 and 3) are rotatably supported on structure fixedly attached to the end of rod 48 extending from cylinder 50. Cable 14 passes around pulleys 44 and 46 at the upper end of actuator 30, and around pulleys 52 and 54, mounted for rotation about fixed axes at the lower end of the actuator, and is anchored as indicated at 56. Cylinder 50 is connected in conventional fashion to a hydraulic or pneumatic power supply (not shown) for reciprocal movement of rod 48, and therefore pulleys 44 and 46. The particular manner of arranging the cable and pulleys, including the actual number of pulleys used, is entirely a matter of choice and design determined in accordance with the desired relation between actuator movement and the corresponding movement of shell 10. Vertical support 58 may be provided in conjunction with the actuator to provide greater lateral stability, with members 60 and 62 attached to the structure on the end of rod 48 movable loosely within or upon the vertical support.

Figure 2:
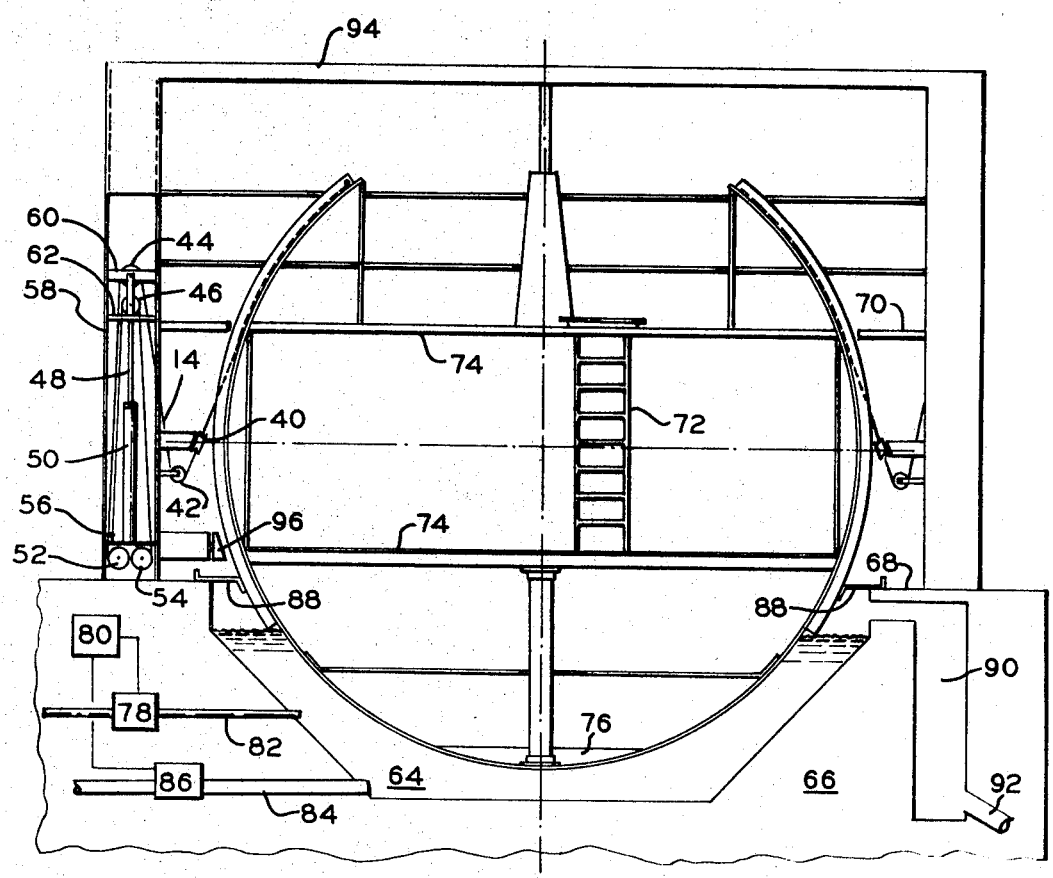
FIG. 2 is an elevational view, partly in section and partly diagrammatic, showing additional details of the simulator of FIG. 1.
Figure 3:
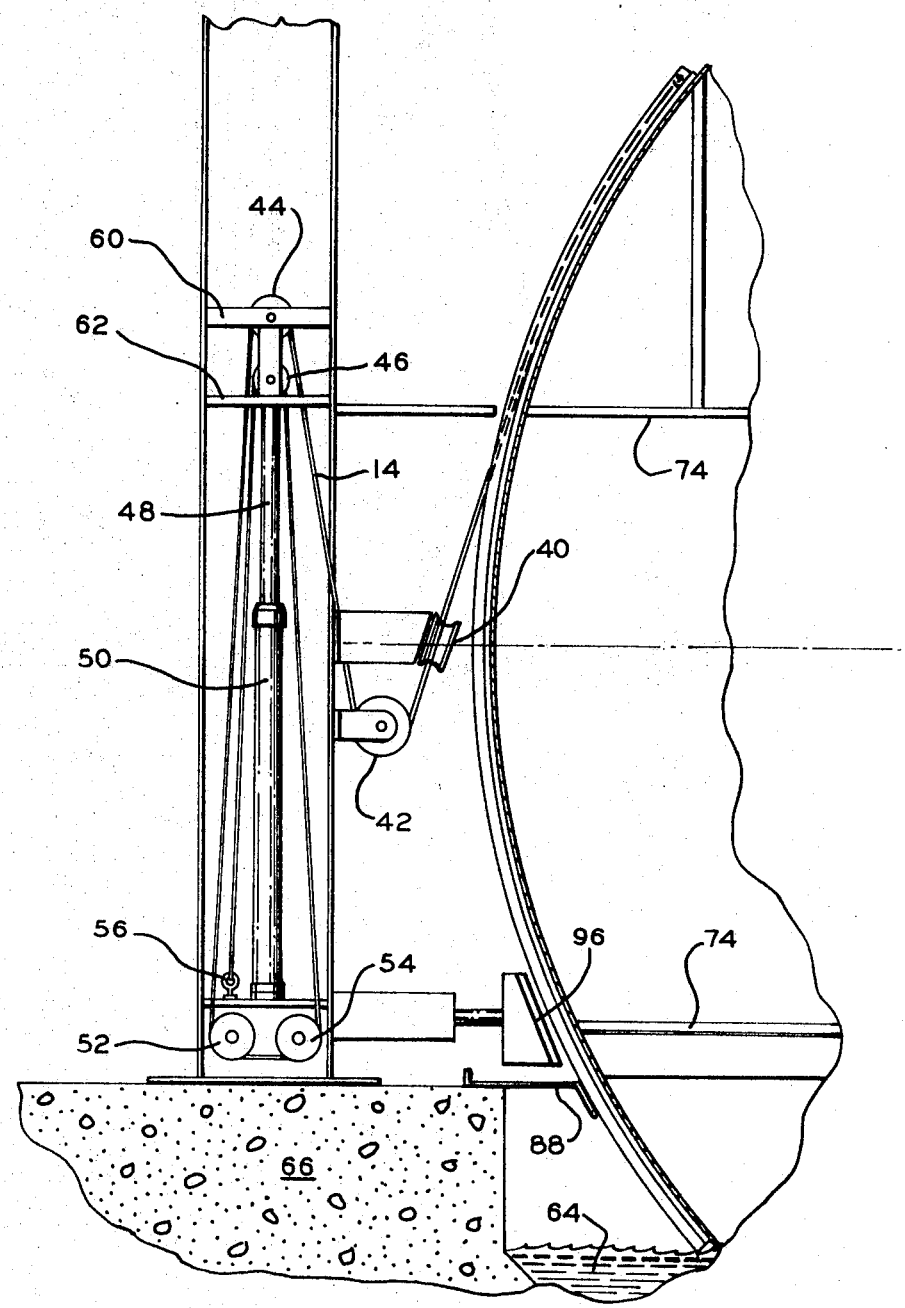
FIG. 3 is an enlarged view showing more clearly certain portions of FIG. 2.

In FIG. 2, shell 10 is seen to be floated upon a quantity of water or other suitable liquid 64 within tank 66. The motion actuators are fixedly attached to platform 68 which runs around the outside edge of tank 66. Access walkway 70 passes around shell 10 at an elevated position to allow entry and exit to and from the interior of shell 10 through opening 12. Walkway 70 may conveniently be supported upon the vertical supports, such as support 58, for the motion actuators in addition to any intermediate supports required. Suitable ladders and platforms 72 and 74 are provided within shell 10 as required. It will also be desirable, in most applications, to provide a suitable ballast or counterweight 76 at the bottom of shell 10. The location of the center of gravity may be controlled by the amount of counterweight used but, in the embodiment shown, any rotational movement of shell 10 will be about the geometric center thereof. Thus, the counterweight may provide a certain biasing force tending to maintain shell 10 in a stable, level position.

Assuming the orientation of the simulator training compartment within shell 10 to be such that a line passing through actuators 30 and 34 runs from front to rear, operation of these actuators will result in movement of the simulator about the pitch axis. Likewise, operation of actuators 32 and 36, being located adjacent the sides of the simulator, will result in movement about the roll axis. The four actuators must, of course, be programmed to operate cooperatively to produce the desired motion. For example, assuming the front of the simulator to be adjacent actuator 30, forward pitch motion would be accomplished by extending rod 48, thereby in effect reeling in cable 14, while simultaneously retracting the corresponding cylinder rod on actuator 34 to allow paying out of cable 18. Side actuators 32 and 36 could remain stationary since there would be no change in the effective length of cables 16 and 20 during pitch movement only. The horizontal guide pulleys associated with actuators 32 and 36 (corresponding to pulleys 38 and 40 on actuator 30) would insure that cables 16 and 20 remained in their respective guide ways and pulley arrangements during such movement. It is likewise apparent that any desired combination of pitch and roll motion could be achieved, within the design limits of the system, by proper cooperative movements of the various actuators.

Vertical motion of shell 10 may easily be achieved by changing the level of liquid 64 within tank 66 while simultaneously moving all of the cables to correspond with the vertical movement caused by such change in liquid level. Pump 78 is connected to a suitable liquid source and is adapted, upon actuation by controller 80, to supply liquid through line 82 to tank 66. The liquid may be removed through drain line 84 by actuation of valve 86. The flow rate of liquid into and out of tank 66 is preferably controllable between minimum and maximum limits with the maximum limit being governed by the desired maximum vertical acceleration to be imparted to shell 10. This method of imparting vertical motion to shell 10 assumes that tension is maintained in the four cables substantially at the point of natural bouyancy of the shell. That is, shell 10 is allowed to float substantially freely upon the liquid surface and maintains a vertical level in accordance with the level of the liquid. An alternative means of providing vertical motion would be to provide a fixed volume of liquid within the tank which floats shell 10 at its upper limit of vertical movement. Downward movement would be achieved by simultaneously extending all four actuators to force shell 10 into the liquid and the resulting buoyant force of the liquid could be utilized to provide upward motion while retracting all four actuators, thereby allowing all cables to be simultaneously payed out. Such an arrangement, while eliminating the need for programmed supply and drainage of the liquid, would require substantially larger capacities from the actuators, but would allow in most applications greater vertical accelerations. At this point, it should be noted that cable 14 intersects a line connecting the axes of pulleys 38 and 40 at substantially the same point as it intersects a horizontal line through the geometric center of the sphere defined by shell 10. In order to maintain maximum stability and allow accurate motion simulation in both pitch and roll when shell 10 has been moved vertically, the aforementioned point of intersection should remain the same. Therefore, suitable means (not shown in the illustrated embodiment) may be provided for effecting vertical motion of the horizontal guide pulleys of each of the four actuators in conjunction with vertical movement of the sphere so that a line through the pulley axes intersecting the cable remains horizontally aligned with the geometric center of the sphere.

Baffle 88, overflow sump 90 and drain line 92 are provided to prevent any undesirable spilling or splashing of the liquid. Overhead support 94 may be provided as shown in FIG. 2 for the usual electrical wiring and cables normally associated with operation of a simulator complex; that is, the various instruments, controls, etc. within the training compartment are connected by such cables to a power supply, main computer, instructor station, etc. Suitable friction brake means 96 may be provided to abruptly stop motion of shell 10 as in emergency situations, for example, in the event of cable breakage, or the like.

The many advantages of the present invention over conventional simulator motion systems utilizing purely mechanical supports and connections should be apparent from the foregoing description. For example, the hydrostatic support does not limit the angular velocity which can be extremely low. Also, adverse frictional considerations are greatly reduced during motion and there is no friction when the system is at rest. The relationship between actuator and simulator motion is always linear, thus simplifying the programming and control of the actuators. Each angular motion is independent of the other and undesired transmitted vibrations may be virtually eliminated. There are no concentrated loads on any one part of either the floor or the simulator enclosure since all loads are evenly distributed over relatively large surfaces. Thus, the platform can be used for extremely heavy loads prohibitive in comparable mechanical systems, and may be readily adapted to a wide change of load.

The invention may also be adapted to provide motions in other degrees of freedom. For example, a pair of horizontally disposed actuators could be provided with appropriate cables, on each side of the simulator enclosure, to provide rotation about the yaw axis. Alternatively yaw motion could be provided by making the entire platform rotatable. Likewise, horizontal translational motion, either lateral or fore-and-aft, could be provided by mounting the platform supporting the tank upon tracks, or the like, or by making the tank larger and providing means for effecting translational movement of the simulator enclosure over the surface of the liquid.

It will thus be seen that the objects set forth above, among those made apparaent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

What is claimed is:

1. A motion system for imparting controlled movement to the student station of a vehicle simulator, or the like, said system comprising, in combination:
   (a) a container of liquid;
   (b) a substantially spherical shell floated upon said liquid and supporting said student station;
   (c) at least two pairs of flexible cables each attached at one end, at equally spaced intervals, to an upper portion of said shell;
   (d) actuator means for each of said cables reciprocally movable to effect movement of said cables and thereby said shell about a first axis through the geometric center of said shell by cooperative movement of a first pair of said actuator means positioned on opposite sides of said shell, and a second axis through said center and perpendicular to said first axis by cooperative movement of a second pair of said actuator means positioned on opposite sides of said shell;
   (e) a fixed base upon which said actuator means are mounted;
   (f) first guide means for each of said cables extending longitudinally along the outer surface of said shell from points adjacent the attachment of said cables; and
   (g) second guide means for each of said cables fixed with respect to said base and restraining lateral movement of said cables between said shell and said actuator means at the intersection of said cables with horizontal lines through said geometric center.

2. The invention according to claim 1 wherein said actuator means each comprise linear actuators having a first pulley mounted on the movable end with the associated cable passing over said pulley between its attachment at one end to said shell and an attachment at the other end fixed with respect to said base.

3. The invention according to claim 2 wherein said second guide means comprise a pair of adjacent pulleys having rotational axes which are parallel to one another and mutually perpendicular with the axis of said first pulley and the path of said cable between said adjacent pulleys and said first pulley.

References Cited

UNITED STATES PATENTS 2,344,454   3/1944   Plotner _____ 35—12(P)

WILLIAM H. GRIEB, Primary Examiner